(12) United States Patent
Kim

(10) Patent No.: US 7,688,035 B2
(45) Date of Patent: Mar. 30, 2010

(54) APPARATUS AND METHOD FOR CONSERVING BATTERY CHARGE

(75) Inventor: Sang-Woo Kim, Seoul (KR)

(73) Assignee: LG Electronics Inc., Seoul (KR)

(*) Notice: Subject to any disclaimer, the term of this patent is extended or adjusted under 35 U.S.C. 154(b) by 224 days.

(21) Appl. No.: 11/467,719

(22) Filed: Aug. 28, 2006

(65) Prior Publication Data
US 2007/0046255 A1 Mar. 1, 2007

(30) Foreign Application Priority Data
Aug. 26, 2005 (KR) .................. 10-2005-0079075

(51) Int. Cl.
*H02J 7/00* (2006.01)
(52) U.S. Cl. .................. 320/135; 320/128; 455/574
(58) Field of Classification Search .................. 320/128, 320/135, 136, 166; 455/574
See application file for complete search history.

(56) References Cited

U.S. PATENT DOCUMENTS

| 6,205,343 | B1* | 3/2001 | Montgomery, Jr. .......... 455/574 |
| 6,833,983 | B2 | 12/2004 | Nguyen et al. |
| 7,019,416 | B2 | 3/2006 | Sasaki |
| 7,289,778 | B2 | 10/2007 | Sasaki |
| 2003/0052645 | A1* | 3/2003 | Sasaki .......................... 320/110 |
| 2004/0041538 | A1* | 3/2004 | Sklovsky ..................... 320/127 |

FOREIGN PATENT DOCUMENTS

| CN | 1405942 A | 3/2003 |
| CN | 1520072 A | 8/2004 |
| JP | 2000-217265 | 8/2000 |

OTHER PUBLICATIONS

English machine translation of Watanabe, Toshiaki (JP2000-217265).*
STIC Translation of Watanabe, Toshiaki (JP2000-217265).*
English language Abstract of JP 2000-217265.

* cited by examiner

*Primary Examiner*—Patrick J Assouad
*Assistant Examiner*—Aaron Piggush
(74) *Attorney, Agent, or Firm*—Birch, Stewart, Kolasch & Birch, LLP

(57) ABSTRACT

A portable device includes a battery, electronic circuitry, and a peak current provider that provides a peak current to the electronic circuitry. Power is supplied to the portable device by connecting a battery to a peak current provider, charging the peak current provider, and supplying a current from the battery to electronic circuitry of the portable device, when a current required by the electronic circuitry is less than or equal to a preset value, and disconnecting the battery from the peak current provider and supplying a current from the peak current provider to the electronic circuitry, when a current required by the electronic circuitry is greater than the preset value.

18 Claims, 6 Drawing Sheets

APPARATUS AND METHOD FOR CONSERVING BATTERY CHARGE

This application claims the benefit of Korean Patent Application No.10-2005-0079075, filed on Aug. 26, 2005, which is hereby incorporated by reference in its entirety.

BACKGROUND OF THE INVENTION

1. Field of the Invention

The present invention relates to portable devices and, more particularly, to an apparatus and method for conserving a charge of a battery in a portable device.

2. Description of the Related Art

There has been a recent proliferation of portable devices capable of performing multiple functions such as a communication function, a personal organizer function, a camera function, a game function, and/or a music player function. As these devices have been developed to perform functions at higher speeds, the power consumption of these devices has considerably increased. Accordingly, it is becoming more important to manage the power consumption of these devices effectively.

To operate a portable device, a battery which supplies power to the portable device must have a charge of at least a minimum voltage, referred to as a cutoff voltage. When the battery charge decreases below this cutoff voltage, the portable device will shut off.

For example, a conventional Global System for Mobile communications (GSM) mobile terminal utilizes a lithium-ion battery which has a capacity of 4.2 V. The conventional GSM mobile terminal has a cutoff voltage of 3.4 V, and will thus shut off when the charge of the battery drops below 3.4 V.

Due to chemical properties of a battery, if an output current of the battery severely fluctuates, this causes the battery charge to drain quickly. In contrast, when the output current of the battery is relatively constant, the battery charge does not drain as quickly.

Further, the larger the current the battery outputs, the more the battery charge drains.

FIG. 1 shows a block diagram of a conventional portable device.

The conventional portable device shown in FIG. 1 includes a battery 12 which supplies power to electronic circuitry 16 of the device, which includes a Power Amplifier Module (PAM) 14 that directs connects to the battery 12.

The battery 12 supplies power to the electronic circuitry 16 through the PAM 14. When the charge of the battery 12 drops below a cutoff voltage, the portable device shuts off.

The electronic circuitry 16 is powered by an electric current provided by the battery 12. During some modes of operation of the portable device, the current requirement of the electronic circuitry 16 fluctuates. For example, FIG. 2 shows a graph of exemplary current requirements of the electronic circuitry 16 of a portable device while it is in a call communication mode. As shown in FIG. 2, the current requirement fluctuates between a peak current of 2.1 A, and a low current of 20 mA.

Since the output current of the battery 12 severely fluctuates, this causes the battery charge to drain quickly, as mentioned above. When the charge of the battery 12 drops below the cutoff voltage, the portable device shuts off.

SUMMARY OF THE INVENTION

An object of the present invention is to conserve the charge of a battery, thereby extending its usage time.

To achieve at least this object, there is provided a portable device which includes a battery, electronic circuitry and a peak current provider that provides a peak current to the electronic circuitry.

The peak current provider may include a current limiter, connected in series with the battery, which prevents the battery from outputting a current of more than a preset value. The portable device may also include a current limiter controller that controls the preset value. The preset value may be 0.4 A.

The peak current provider may include a capacitor connected in parallel with the battery. The capacitor may have a capacitance of tens to hundreds of mE.

The peak current provider may be integrated with the battery or the electronic circuitry. The electronic circuitry may include a power amplifier module connected to the peak current provider. The portable device may be a mobile communication terminal.

There is also provided a method of supplying power to a portable device which includes connecting a battery to a peak current provider, charging the peak current provider, and supplying a current from the battery to electronic circuitry of the portable device, when a current required by the electronic circuitry is less than or equal to a preset value, and disconnecting the battery from the peak current provider and supplying a current from the peak current provider to the electronic circuitry, when a current required by the electronic circuitry is greater than the preset value.

There is also provided a method of supplying power to a portable device which includes connecting a battery to a peak current provider, charging the peak current provider, and supplying a current from the battery to electronic circuitry of the portable device, when the portable device is idle or receiving a communication signal, and disconnecting the battery from the peak current provider and supplying a current from the peak current provider to the electronic circuitry, when the portable device is transmitting a communication signal.

Additional advantages and features of the invention will be set forth in the description which follows and will become apparent to those having ordinary skill in the art upon examination of the following or may be learned from practice of the invention.

BRIEF DESCRIPTION OF THE DRAWINGS

The present invention is described in the detailed description that follows, with reference to the following noted drawings which illustrate non-limiting examples of embodiments of the present invention, and in which like reference numerals represent similar parts throughout the drawings.

DETAILED DESCRIPTION OF THE INVENTION

An apparatus and method for conserving a charge of a battery of a portable device is described below with reference to FIGS. 3 and 4.

Figure 1:
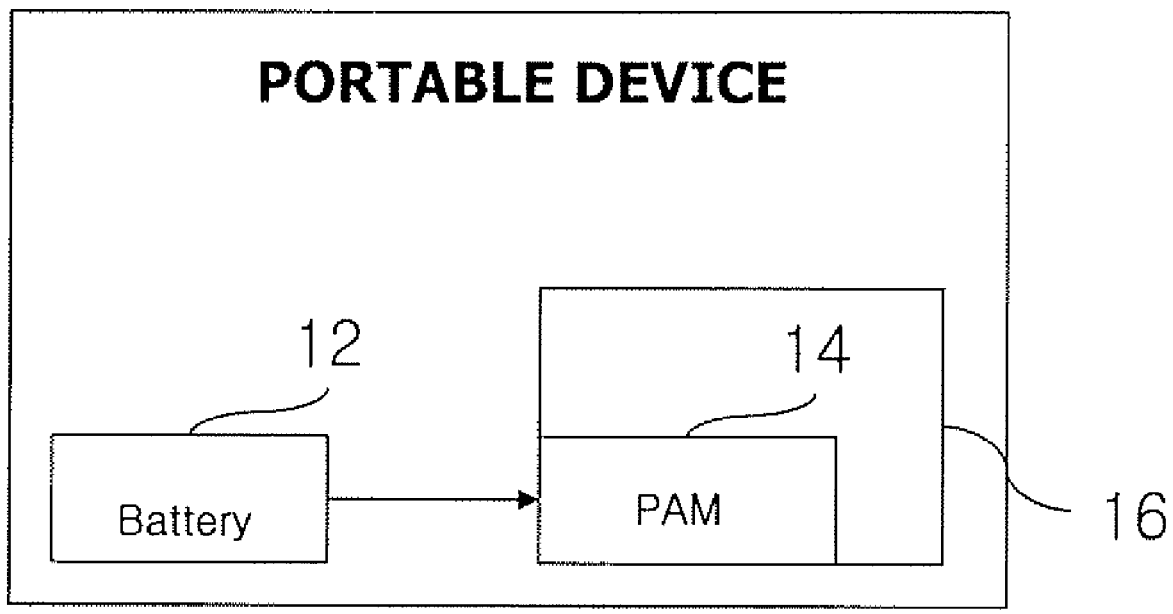
FIG. 1 is a schematic block diagram showing a conventional portable device.
Figure 2:
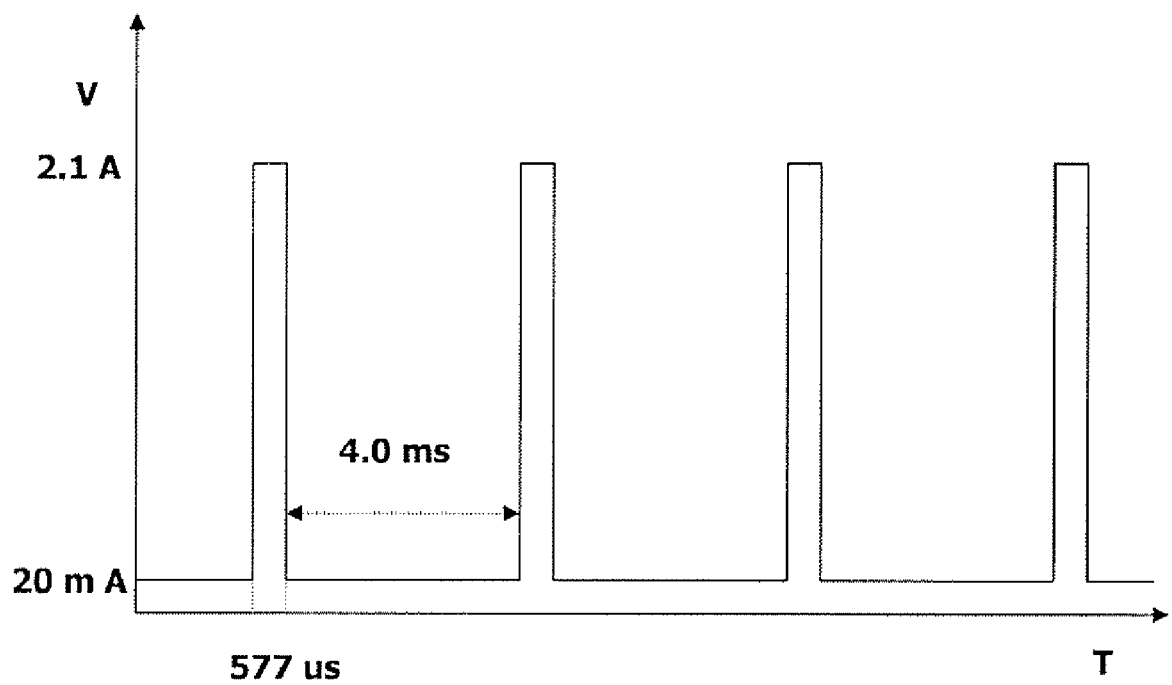
FIG. 2 is a graph of current requirements of a conventional portable device.
Figure 3:
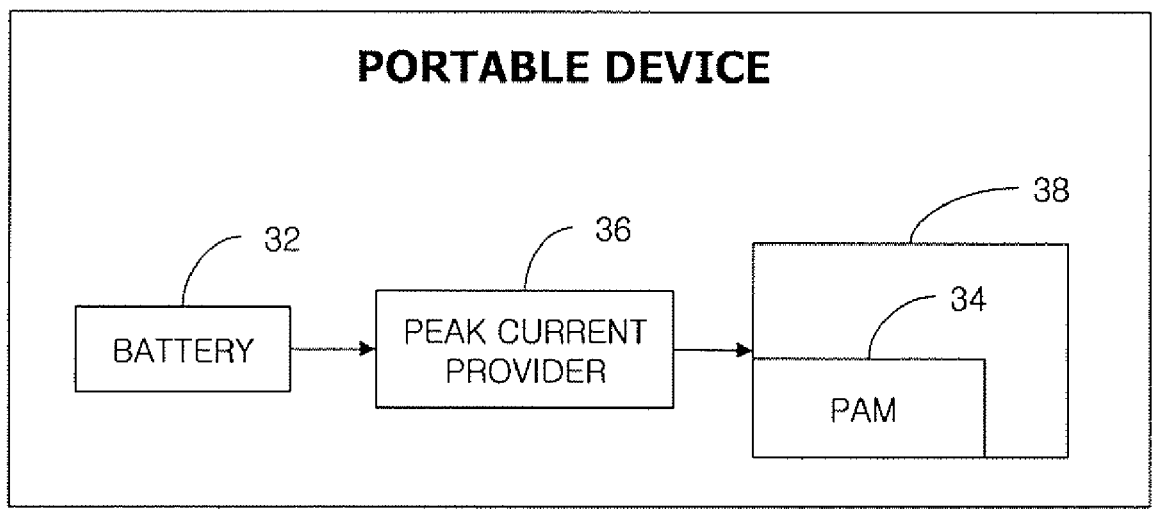
FIG. 3 is a schematic block diagram showing a portable device in accordance with an embodiment of the present invention.

FIG. 3 shows a block diagram of a portable device, such as, but not limited to, a mobile communication terminal. The portable device shown in FIG. 3 includes a battery 32, electronic circuitry 38 including a PAM 34, and a peak current provider 36, connected in series with the battery 32, which supplies a peak current to the electronic circuitry 38 via the PAM 34. The battery 32 provides a current to the peak current provider 36, rather than providing a current directly to the PAM 34.

Figure 4:
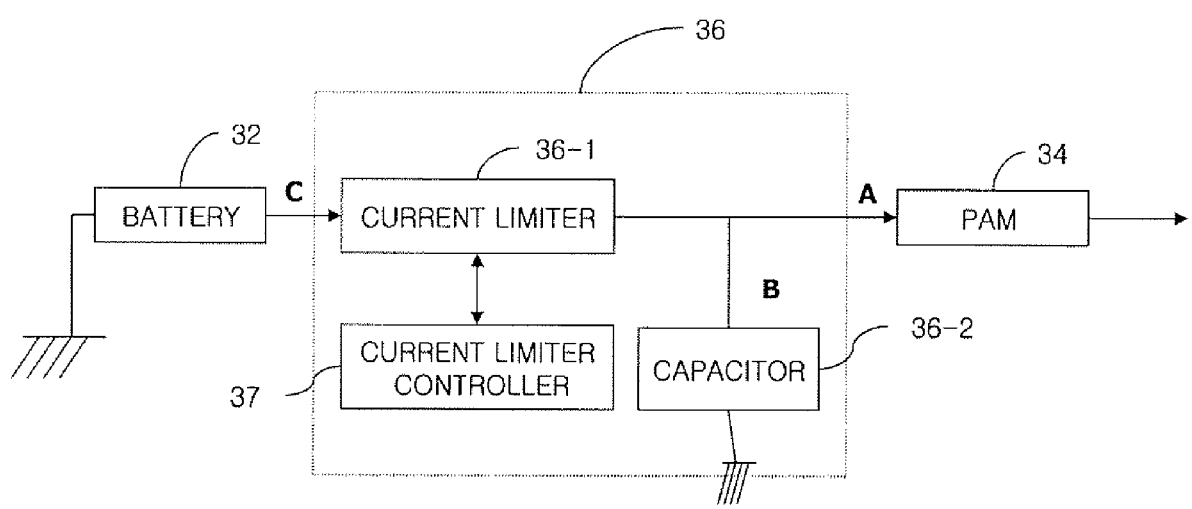
FIG. 4 is a schematic block diagram showing a portable device in accordance with an embodiment of the present invention.

As shown in FIG. 4, the peak current provider 36 includes a current limiter 36-1 which limits a current from the battery 32 to a preset value, a current limiter controller 37 which controls the preset value of the current limiter 36-1, and a capacitor 36-2 which connects to the PAM 34, in parallel with the battery 32. The current limiter 36-1 is connected in series with the battery 32, and blocks a current from the battery 32 which exceeds the preset value.

The current limiter controller 37 varies the preset value of the current limiter 36-1 according to current requirements of the electronic circuitry 38 of the portable device, For example, when the peak current requirement of the electronic circuitry 38 is high (such as, for example, when a user of the portable device is playing a game or operating a camera flash LED), the current limiter controller 37 increases the preset value of the current limiter 36-1.

The capacitor 36-2 supplies a peak current to the electronic circuitry 38. In order to do so, the capacitor 36-2 stores a charge, which is replenished by the battery 32. In a preferred embodiment, the capacitor 36-2 has a capacitance of tens to hundreds of mF, The peak current provider 36 may be integrated with either the battery 32 or the electronic circuitry 38.

An operation of the portable device described above is now described with reference to FIGS. 5A-5C and FIG. 6.

Figure 5A:
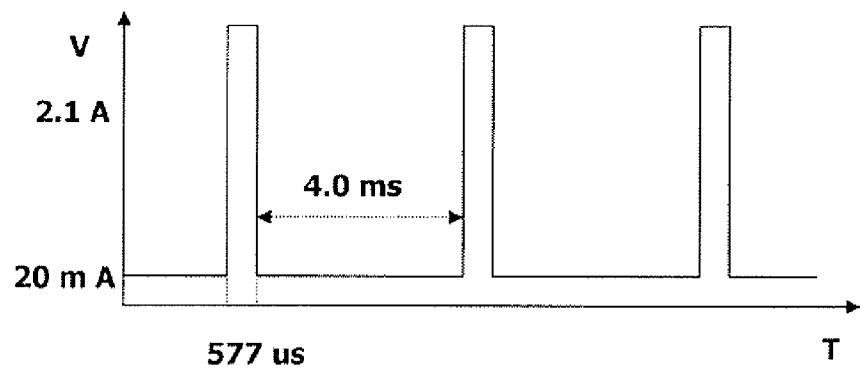
FIGS. 5A to 5C are graphs showing currents passing through nodes A, B and C in FIG. 4.

FIG. 5A illustrates the current requirements of the electronic circuitry 38 when the portable device is in an exemplary operation mode, such as a call communication mode. During this operation mode, the current requirements fluctuate between a peak current of 2.1 A, for example, and a low current of 20 mA, for example, In the following example, the preset value of the current limiter 36-1 is set to 0.4 A. When the electronic circuitry 38 requires the peak current of 2.1 A, the current limiter 36-1 will prevent the battery 32 from providing a current of 2.1 A to the electronic circuitry 38, by cutting the battery 32 off from the PAM 34, since 2.1 A is greater than the preset value of 0.4 A. Since the capacitor 36-2 is connected in parallel with the battery 32 to the PAM 34, when the battery 32 is cut off from the PAM 34, the capacitor 36-2 provides the required peak current to the PAM 34.

When the electronic circuitry 38 requires a current less than or equal to the preset value of 0.4 A, the current limiter 36-1 does not cut the battery 32 off from the PAM 34, and thus the battery 32 remains connected to the PAM 34. As the battery 32 provides current to the PAM 34, it simultaneously recharges the capacitor 36-2.

FIG. 5A is a graph of the current passing through node A of FIG. 4, i.e., the input to PAM 34, while the portable device is in a call communication mode. When the portable device transmits a communication signal, 2.1 A of current is provided to the electronic circuitry 38 via the PAM 34. When the portable device is idle, or is receiving a communication signal, only 20 mA of current are provided to the PAM 34. In the embodiment illustrated in FIG. 5A, the transmit period of the portable device is 577 μs, and the receive/idle period is 4.0 ms.

During the transmit period, since the peak current of 2.1 A exceeds the preset value of 0.4 A, the current limiter 36-1 cuts the battery 32 off from the PAM 34, which results in the capacitor 36-2 providing the peak current of 2.1 A to the PAM 34.

However, during the receive/idle period, since the current of 20 mA does not exceed the preset value of 0.4 A, the current limiter 36-1 does not cut the battery 32 off from the PAM 34, and the current of 20 mA is provided to the PAM 34 by the battery 32. Simultaneously, the battery 32 recharges the capacitor 36-2.

Figure 5B:
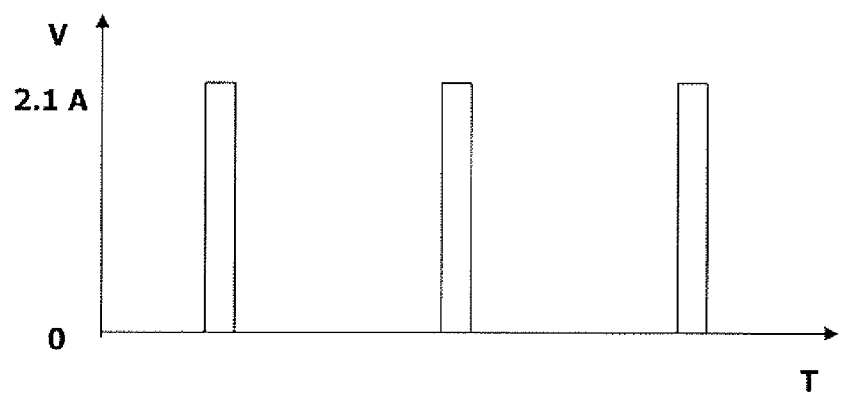
Figure 5C:
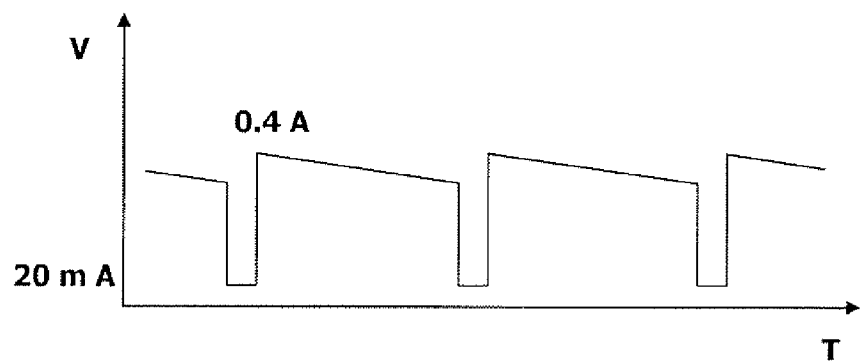

FIG. 5B is a graph of the current passing through node B of FIG. 4, i.e., the output of capacitor 36-2, and FIG. 5C is a graph of the current passing through node C of FIG. 4, i.e., the output of battery 32. As shown in FIG. 5C, the current output by the battery 32 is relatively constant and does not severely fluctuate.

Figure 6:
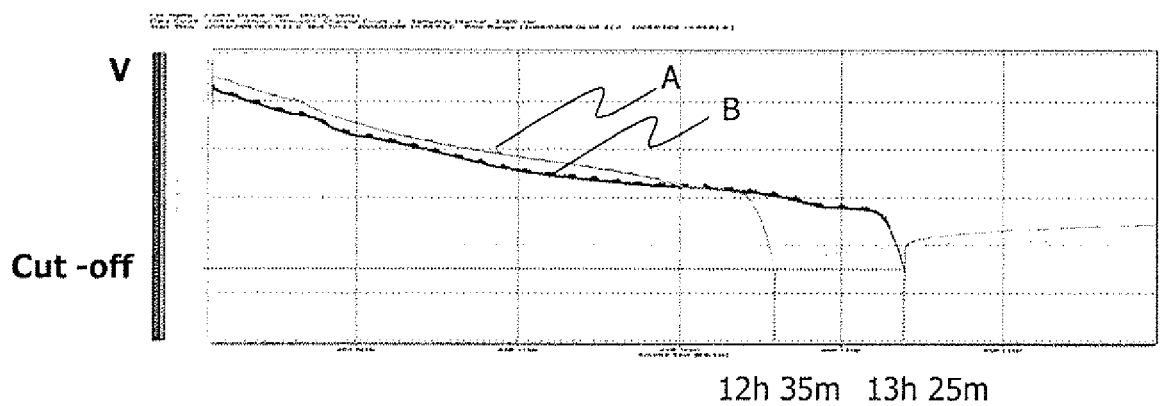
FIG. 6 shows a simulation of a usage time of a battery of a mobile terminal in accordance with the present invention.

FIG. 6 is a graph showing a result of a simulation of a usage time of a battery utilizing the apparatus and method described above. The simulation was performed using a mobile communication terminal with a transmission (TX) level of 5. Line 'A' represents the battery voltage of a conventional mobile communication terminal, and line 'B' represents the battery voltage of a mobile communication terminal utilizing the peak current provider described above.

As shown in FIG. 6, the usage time of the battery of the mobile communication terminal utilizing the peak current provider described above was 13 hours and 35 minutes, while the usage time of the conventional mobile communication terminal was only 12 hours and 35 minutes.

Since the maximum output current of a battery utilizing a peak current provider as described above is significantly less than a peak current (e.g., 0.4 A versus 2.1 A), a maximum voltage drop of the battery is lower than it would be otherwise. As a result, a cutoff voltage of a portable device utilizing the peak current provider can be set to a lower value (e.g., 3.0 V rather than 3.4 V), which contributes to extending the usage time of the battery.

Thus, as the apparatus and method described above relieves a battery from outputting a peak current, it is capable of extending the usage time of the battery.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to an exemplary embodiment, it is understood that the words that have been used are words of description and illustration, rather than words of limitation. As the present invention may be embodied in several forms without departing from the spirit or essential characteristics thereof, it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile communication terminal, comprising:
a battery;
a wireless communication unit configured to wirelessly communicate with at least one other terminal;
a display configured to display information;
electronic circuitry comprising a power amplifier module; and
a peak current provider configured to provide a peak current to the power amplifier module, the peak current provider comprising:
a current limiter, connected in series with the battery, and configured to prevent the battery from outputting a current of more than a preset value;
a current limiter controller configured to vary the preset value according to current requirements of the electronic circuitry; and
a capacitor, connected in parallel with the battery, having a capacitance of tens to hundreds of mF,
wherein the current limiter controller is further configured to selectively vary the preset value to a first value when a standby screen is displayed on the display, to vary the preset value to a second value when a calling operation is being performed on the mobile communication terminal via the wireless communication unit, and to vary the preset value to a third value when another operation is being performed on the mobile communication terminal that is different than the calling operation, and wherein said second and third preset values are higher than the first preset values.

2. The mobile communication terminal according to claim 1, wherein the first preset value is 0.4 A.

3. The mobile communication terminal according to claim 1, wherein the peak current provider is integrated with the battery.

4. The mobile communication terminal according to claim 1, wherein the peak current provider is integrated with the electronic circuitry.

5. The mobile communication terminal according to claim 1, wherein said another operation is a game playing operation being performed on the mobile communication terminal.

6. The mobile communication terminal according to claim 1, wherein said another operation is a camera flash operation being performed on the mobile communication terminal.

7. The mobile communication terminal according to claim 1, wherein during the calling operation, the current limiter is further configured to selectively prevent the battery from outputting a current that is more than the second preset value at equal predetermined time periods.

8. The mobile communication terminal according to claim 7, wherein the equal predetermined time periods include every 4.0 ms during the calling operation.

9. The mobile communication terminal according to claim 1, wherein when the current limiter controller varies the preset value, the current limiter prevents the battery from outputting the current of more than a preset value such that the capacitor provides a current to the power amplifier module.

10. A method for conserving charge of a mobile communication terminal including a battery, a wireless communication unit configured to wirelessly communicate with at least one other terminal, a display configured to display information, electronic circuitry including a power amplifier module, and a peak current provider configured to provide a peak current to the power amplifier module, the method comprising:
preventing, via the peak current provider, the battery from outputting a current of more than a preset value; and
selectively varying, via the peak current provider, the preset value to a first value when a standby screen is displayed on the display, varying the preset value to a second value when a calling operation is being performed on the mobile communication terminal via the wireless communication unit, and varying the preset value to a third value when another operation is being performed on the mobile communication terminal that is different than the calling operation, said second and third preset values being higher than the first preset values.

11. The method according to claim 10, wherein the first preset value is 0.4 A.

12. The method according to claim 10, wherein the peak current provider is integrated with the battery.

13. The method according to claim 10, wherein the peak current provider is integrated with the electronic circuitry.

14. The method according to claim 10, wherein said another operation is a game playing operation being performed on the mobile communication terminal.

15. The method according to claim 10, wherein said another operation is a camera flash operation being performed on the mobile communication terminal.

16. The method according to claim 10, wherein during the calling operation, the selectively preventing step prevents the battery from outputting a current that is more than the second preset value at equal predetermined time periods.

17. The method according to claim 16, wherein the equal predetermined time periods include every 4.0 ms during the calling operation.

18. The method according to claim 10, wherein when the selectively varying step varies the preset value, the peak current provider prevents the battery from outputting the current of more than a preset value such that the capacitor provides a current to the power amplifier module.

* * * * *